(12) United States Patent
Ouderkirk et al.

(10) Patent No.: US 11,209,775 B2
(45) Date of Patent: Dec. 28, 2021

(54) OPTICAL SYSTEM WITH POLARIZATION VOLUME HOLOGRAM

(71) Applicant: Facebook Technologies, LLC, Menlo Park, CA (US)

(72) Inventors: Andrew John Ouderkirk, Menlo Park, CA (US); Robin Sharma, Menlo Park, CA (US); Hannah Noble, Menlo Park, CA (US); Babak Amirsolaimani, Menlo Park, CA (US); Yusufu Njoni Bamaxam Sulai, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 305 days.

(21) Appl. No.: 16/417,223

(22) Filed: May 20, 2019

(65) Prior Publication Data
US 2020/0371474 A1 Nov. 26, 2020

(51) Int. Cl.
*G03H 1/02* (2006.01)
*G02B 5/32* (2006.01)
*G02B 27/28* (2006.01)

(52) U.S. Cl.
CPC .............. *G03H 1/0248* (2013.01); *G02B 5/32* (2013.01); *G02B 27/283* (2013.01); *G03H 1/0256* (2013.01); *G03H 2223/23* (2013.01)

(58) Field of Classification Search
CPC ............... G03H 1/0248; G03H 1/0256; G03H 2223/23; G03H 1/0808; G03H 2240/15; G02B 5/32; G02B 27/283; G02B 2027/0107; G02B 2027/0174; G02B 27/0172; G02B 27/4261; G02B 27/0093
See application file for complete search history.

(56) References Cited

U.S. PATENT DOCUMENTS

2017/0373459 A1 12/2017 Weng et al.
2018/0143438 A1 5/2018 Oh

OTHER PUBLICATIONS

International Search Report and Written Opinion dated Sep. 3, 2020, in PCT Application No. PCT/US2020/033519, filed on May 19, 2020 (11 pages).

*Primary Examiner* — Cara E Rakowski
(74) *Attorney, Agent, or Firm* — Millburn IP PLLC

(57) ABSTRACT

An optical system includes a substrate and a polarization volume hologram (PVH) composite film formed over the substrate. The PVH composite film includes a first PVH layer formed over the substrate and having a helix twist of a first handedness, and a second PVH layer coupled to the first PVH layer and having a helix twist of a second handedness orthogonal to the first handedness. The first PVH layer is configured to reflect and converge circularly polarized light having the first handedness. The second PVH layer is configured to reflect and converge circularly polarized light having the second handedness.

19 Claims, 7 Drawing Sheets

100

100

OPTICAL SYSTEM WITH POLARIZATION VOLUME HOLOGRAM

TECHNICAL FIELD

The present disclosure relates to an optical system and, more specifically, to an optical system with polarization volume hologram (PVH) layer.

BACKGROUND

Head-Mounted Display (HMD) has been widely used in, e.g., video playback, gaming, and sports. One major application of HMD is to realize virtual reality (VR) or augmented reality (AR).

Some VR or AR applications require an eye tracking function that monitors the eye of the user and/or the region surrounding the eye of the user. By monitoring the eye and/or the surrounding region, the HMD can determine a gaze direction of the user, which can be used for improving display quality, performance, and/or user experience, and can be used to address vergence/accommodation conflict. Further, by monitoring the eye and/or the surrounding region, the HMD can estimate the psychological state and/or changes in the psychological state of the user, as well as physical characteristics of the user. The above information can be used by the HMD to, e.g., determine what content to provide to the user. For example, if the user is concentrating on a particular task or activity, the HMD may determine the user prefers not to be interrupted with other information unless such information would be important to the user. However, in conventional technologies, because of the small size of HMD, especially smart glasses, it is difficult to arrange various extra components for eye tracking.

SUMMARY

In accordance with the disclosure, there is provided an optical system including a substrate and a polarization volume hologram (PVH) composite film formed over the substrate. The PVH composite film includes a first PVH layer formed over the substrate and having a helix twist of a first handedness, and a second PVH layer coupled to the first PVH layer and having a helix twist of a second handedness orthogonal to the first handedness. The first PVH layer is configured to reflect and converge circularly polarized light having the first handedness. The second PVH layer is configured to reflect and converge circularly polarized light having the second handedness.

DETAILED DESCRIPTION

Figure 1A:
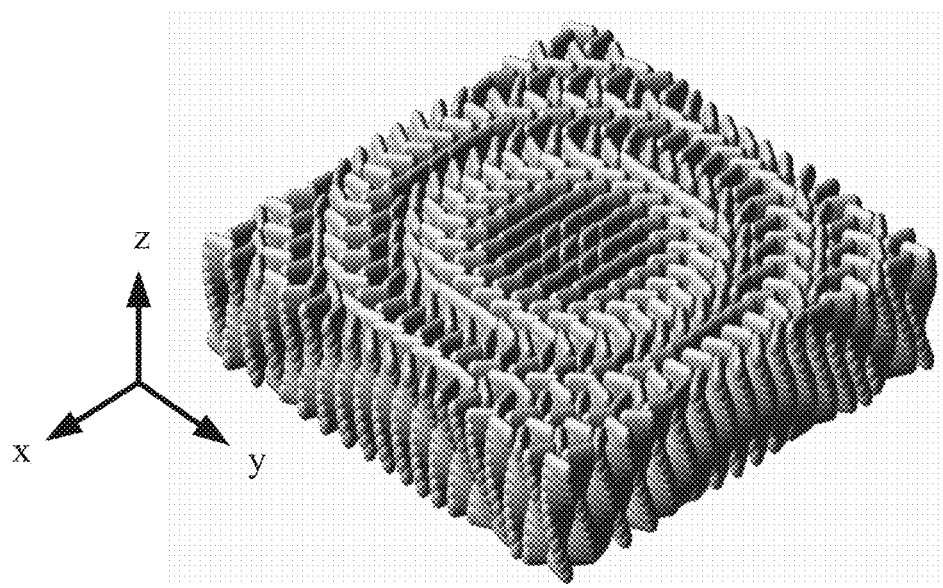
FIGS. 1A-1D schematically show an example PVH layer consistent with the disclosure.

Hereinafter, embodiments consistent with the disclosure will be described with reference to drawings, which are merely examples for illustrative purposes and are not intended to limit the scope of the disclosure. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. The described embodiments are some but not all of the embodiments of the present disclosure. Based on the disclosed embodiments, persons of ordinary skill in the art may derive other embodiments consistent with the present disclosure, all of which are within the scope of the present disclosure.

Figure 1B:
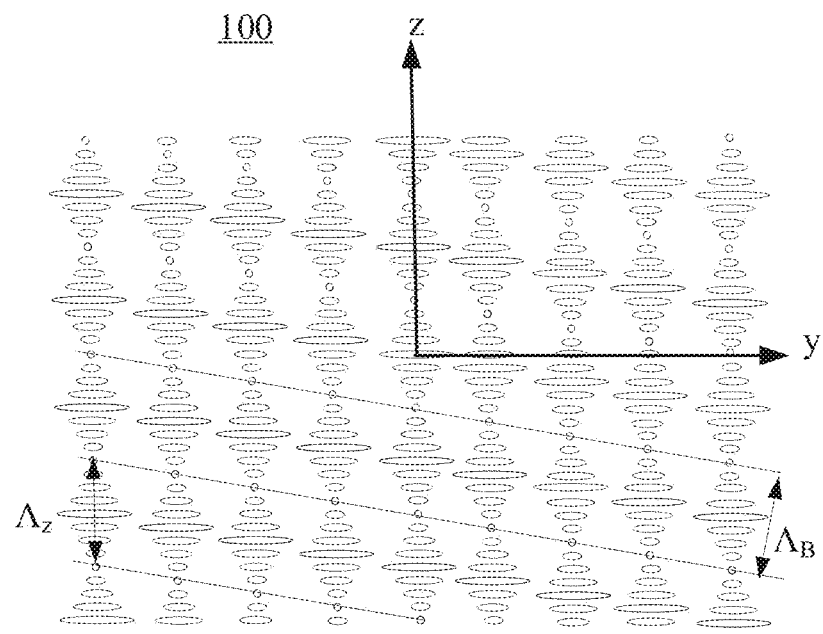
Figure 1C:
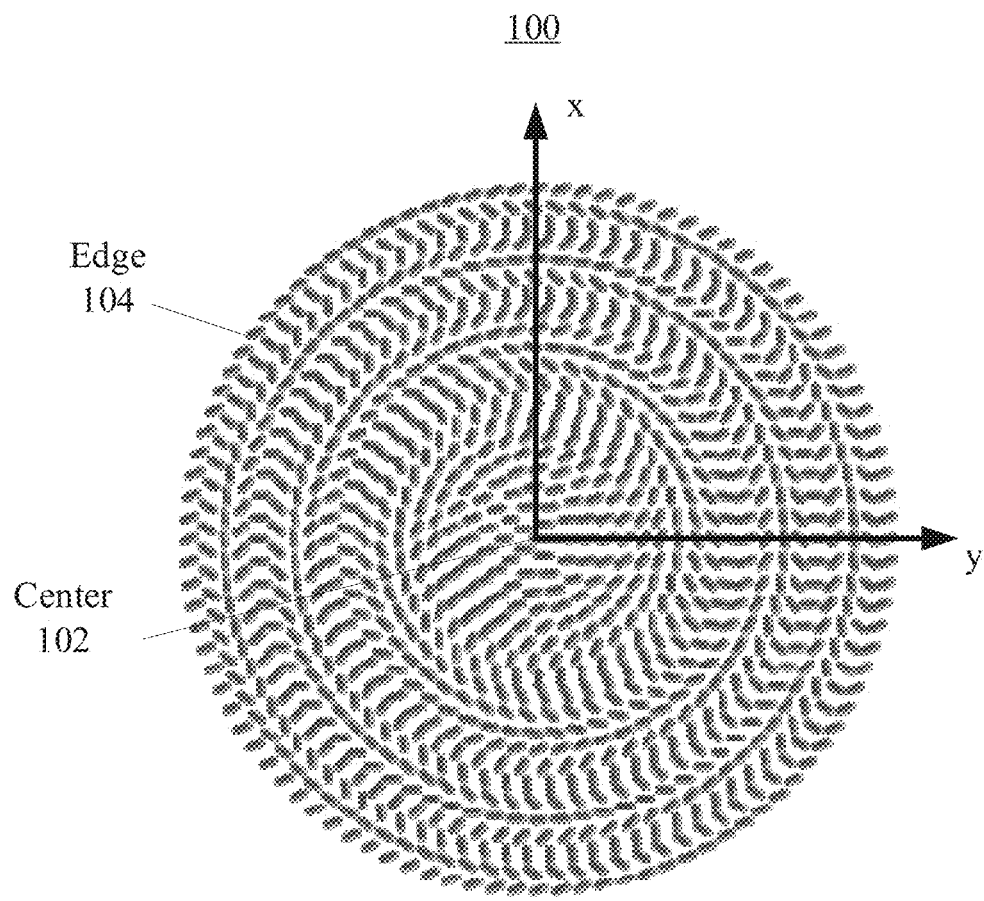
Figure 1D:
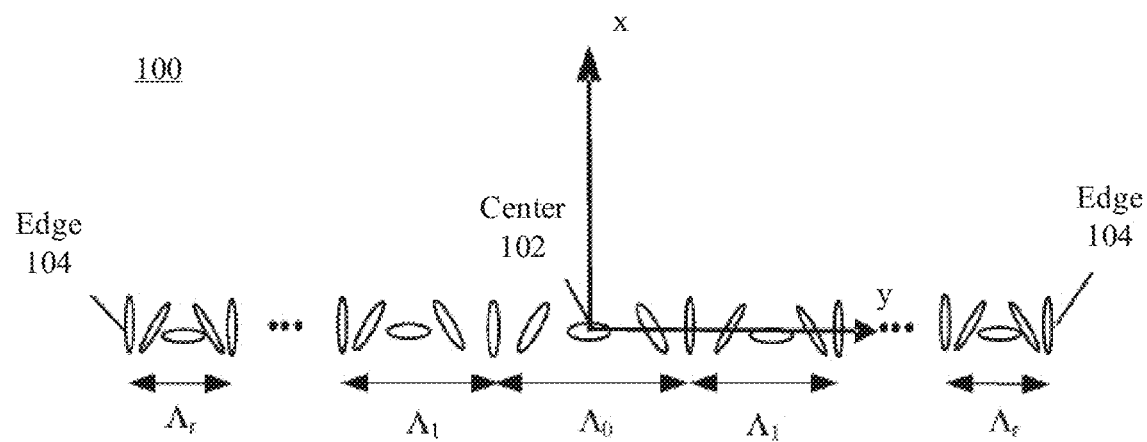

The present disclosure provides an optical system using one or more polarization volume hologram (PVH) layer configured to reflect infrared (IR) light for, e.g., eye tracking purposes. A PVH layer includes a plurality of liquid crystal (LC) molecules which are spatially orientated to enable at least one optical function of the PVH layer, and is also referred to as, e.g., "polarization sensitive gratings," "polarization sensitive optical elements," "liquid crystal gratings," or "chiral liquid crystal elements." FIGS. 1A-1D schematically show an example PVH layer 100 consistent with the disclosure. FIG. 1A is a perspective view of the PVH layer 100. FIG. 1B is a cross-sectional view of the PVH layer 100 in the y-z plane. FIG. 1C is a plan view of the PVH layer 100 in the x-y plane. FIG. 1D is a partial plan view of the PVH layer 100 in the x-y plane along the y-axis from a center region of the PVH layer 100 to an edge region of the PVH layer 100.

The optical function of a PVH layer can be determined based on the manipulation of optic axes of the LC molecules in the PVH layer. Hereinafter, an orientation of the optic axis of an LC molecule is also referred to as an orientation or alignment of the LC molecule. The manipulation of optic axes of the LC molecules in the PVH layer is a 3-dimensinoal (3D) alignment of the LC molecules. A PVH layer consistent with the disclosure can deflect, light via Bragg diffraction. The Bragg grating in the PVH layer can be created by adding a chiral dopant to induce helical twist along the vertical direction, e.g., the z-axis direction shown in FIGS. 1A and 1B.

As shown in FIG. 1B, in the z-axis direction of the PVH layer 100, the LC molecules twist and the rotating angle changes continuously and periodically along the z-axis with a period of $\Gamma_z$. The period $\Gamma_z$ (or pitch length $p=2\Gamma_z$) can be adjusted by controlling the helical twist power (HTP) and concentration of the chiral dopant. Similarly, an in-plane periodicity in the x-y plane is also introduced into the PVH layer 100 by, e.g., modifying the surface alignment of the PVH layer 100 to provide a rotation of the LC molecules in the x-y plane. As a result, the Bragg planes in the PVH layer 100 become slanted, as indicated by the slanted lines in FIG. 1B. The distance between neighboring slanted lines is the Bragg period AB of the Bragg grating formed by the LC molecules in the PVH layer 100. The Bragg period AB can depend on the z-axis period $\Gamma_z$ of the LC molecules and a slanting angle of the Bragg planes with respect to a surface of the PVH layer 100.

The slanted Bragg planes can allow the PVH layer 100 to redirect incident light to be converged or diverged in reflection or in transmission. Thus, through further manipulation of the orientation of the LC molecules in the x-y plane, the PVH layer 100 can be configured to function as a lens, such as a reflective lens, that can, e.g., converge or diverge incident light. The PVH layer is thus also referred to as a "PVH lens."

Consistent with the disclosure, as shown in FIGS. 1A and 1C, the PVH layer 100 creates a respective lens profile via the in-plane (x-y plane) orientation (azimuth angle θ) of the LC molecules, in which the phase difference T=2θ. In the PVH layer 100, the azimuth angles of LC molecules change continuously from a center 102 to an edge 104 of the PVH layer 100, with a varied period Γ, i.e., a distance between two LC molecules whose azimuth angles differ from each other by 180°.

The lens of the PVH layer 100 may include a certain symmetry in the arrangement of the LC molecules about an optical axis of the PVH layer 100, which, for example, may pass through the center 102 of the PVH layer 100. As shown in FIGS. 1A and 1C, the LC molecules in at least a portion of the PVH layer 100 are orientated or aligned rotationally-symmetrically (e.g., three-fold, four-fold, six-fold, or eight-fold) about the optical axis of the PVH layer 100. In some embodiments, in the center portion of the PVH layer 100, the LC molecules are aligned rotationally-symmetrically about the optical axis of the PVH layer 100. In some embodiments, the rotational-symmetry of the LC molecules can be axisymmetry, i.e., the LC molecules in the at least one portion can be aligned axisymmetrically about the optical axis of the PVH layer 100.

The change of LC orientation from the center 102 to the edge 104 of the PVH layer is more clearly seen in the partial plan view of FIG. 1D. As shown in FIG. 1D, for the LC orientation, a rate of period variation from the center 102 to the edge 104 of the PVH layer 100 is a function of distance from the center 102, and increases with the distance from the center 102. For example, the period at the center 102 ($Γ_0$) is the longest, the period at the edge 104 ($Γ_r$) is the shortest, and the period in between (e.g., $Γ_1$) is moderate, i.e., $Γ_0 > Γ_1 > \ldots > Γ_r$.

Figure 2A:
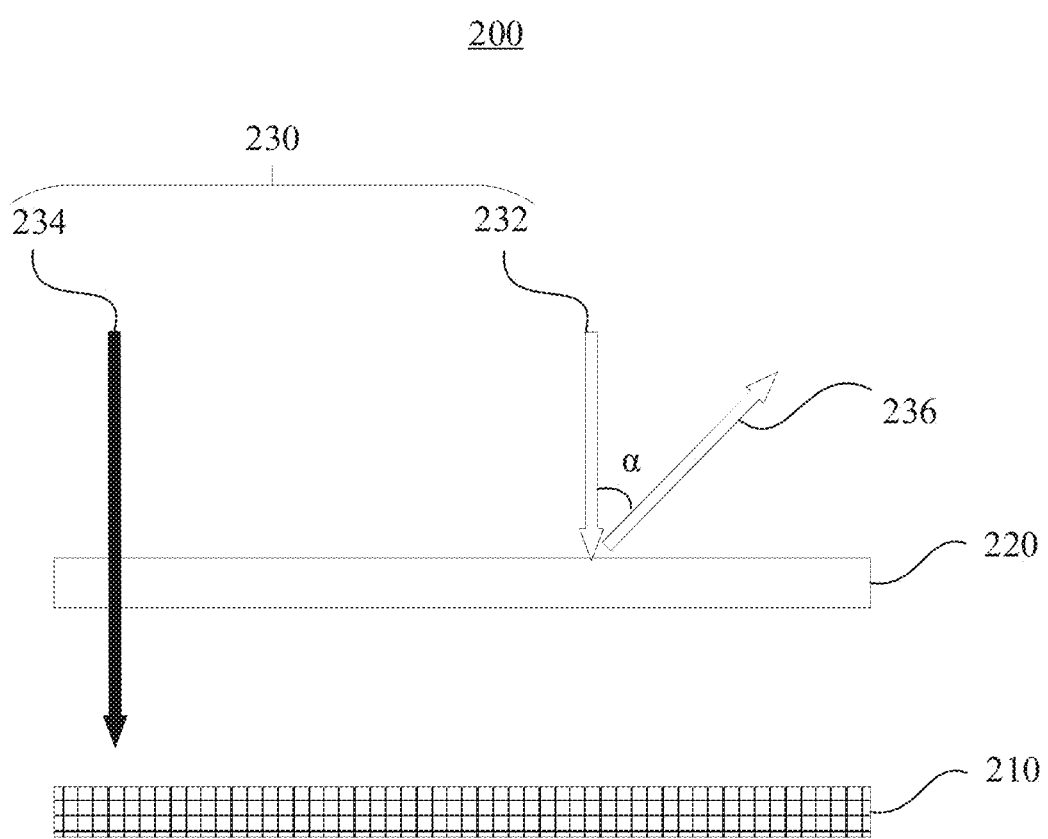
FIGS. 2A and 2B are schematic view of an example optical system consistent with the disclosure.

FIG. 2A is a schematic view showing a portion of an example optical system 200 consistent with the disclosure. The optical system 200 includes a substrate 210 and a PVH layer 220. The substrate 210 provides support to the PVH layer 220, and can be, for example, a piece of rigid material, such as glass, a piece of flexible material, such as plastic, or a functional device, such as a display screen. For illustrative purposes, in FIG. 2A, the substrate 210 and the PVH layer 220 are shown as spaced apart from each other. In actual implementation, they can contact each other or be spaced apart from each other by, for example, one or more spacing members, or by being held at different places of a frame or a housing of the optical system 200. In some embodiments, additional layer(s), such as protection layer(s) and/or buffer layer(s), can be arranged between the substrate 210 and the PVH layer 220.

The PVH layer 220 can be any PVH layer consistent with the disclosure, such as the PVH layer 100 described above in connection with FIGS. 1A-1D. As shown in FIG. 1B, the LC molecules are aligned in a helix twist with helix axis along the z-direction. The helix twist can be either left-handed or right-handed. A PVH layer may allow deflection for one circularly polarized light while the other polarization may transmit through. In some embodiments, a PVH layer can deflect circularly polarized light having a same handedness as the helix twist of the PVH layer and transmit circularly polarized light having an orthogonal handedness. In some embodiments, depending on how the LC molecules in the PVH layer are aligned, the PVH layer can either converge or diverge the incident light.

For illustrative purpose and as an example, in the description below, the PVH layer 220 is described as having a helix twist of right handedness (indicated by hollow block in the figure). In some other embodiments, the PVH layer 220 can have a helix twist of left handedness.

As shown in FIG. 2A, incident light 230 includes two components that are polarized in mutually perpendicular (orthogonal) directions, i.e., a first incident light ray 232 having a right-handed circular polarization (indicated by hollow arrow in the figure) and a second incident light ray 234 having a left-handed circular polarization (indicated by solid arrow in the figure). Because the first incident light ray 232 has a same handedness as the helix twist of the PVH layer 220, the first incident light ray 232 is reflected by the PVH layer 220 to form a reflected light ray 236. Further, the PVH layer 220 does not change the handedness of the polarization of the first incident light ray 232, and hence the reflected light ray 236 retains the handedness of the polarization, i.e., also having a right-handed circular polarization. On the other hand, because the second incident light ray 234 has a different handedness than the PVH layer 220, the second incident light ray 234 passes through the PVH layer 220 without being reflected and without changing the handedness of the polarization.

As described above, a PVH layer can reflect incident light by the Bragg grating formed by the LC molecules in the PVH layer. The angle between the incident light ray and the reflected light ray can depend on the wavelength of the light and the Bragg period of the Bragg grating in the PVH layer. Therefore, an angle α between the first incident light ray 232 and the reflected light ray 236 can depend on the Bragg period of the Bragg grating in the PVH layer 224 and the wavelength of the first incident light ray 232.

The optical power of a PVH layer determines a degree to which the PVH layer can converge or diverge light and can be inversely proportional to a focal length or effective focal length of the PVH layer. The optical power of the PVH layer can be adjusted by changing the alignment of the LC molecules in the PVH layer to change the angle of reflection at different points of the PVH layer. Changing the optical power of a PVH layer may also change a field of view (FOV) of the PVH layer.

Similar to the optical power, the optical axis of a PVH layer can also be adjusted by changing the alignment of the LC molecules in the PVH layer. The direction of the optical axis of the PVH layer may or may not be perpendicular to the surface of the PVH layer.

Figure 2B:
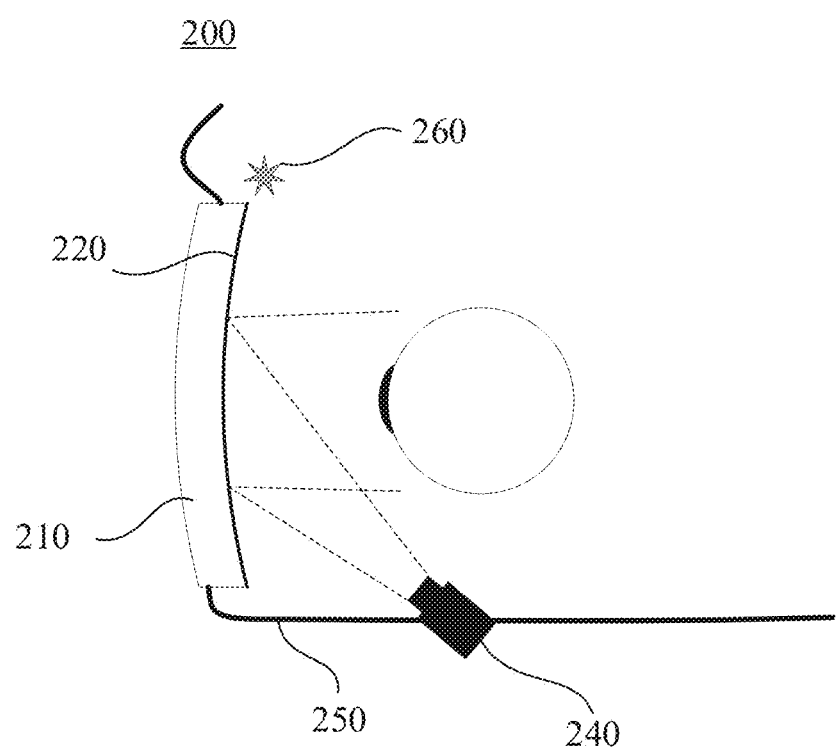

FIG. 2B is another schematic view of the optical system 200. In FIG. 2B, the optical system 200 is shown as a head-mounted display, such as smart glasses. FIG. 2B shows a portion of the optical system 200, where the un-shown portion of the optical system 200 can be symmetric to the illustrated portion of the optical system 200.

As shown in FIG. 2B, the optical system 200 further includes an optical sensor 240 configured to generate an image using polarized light reflected by the PVH layer 220. In some embodiments, the optical sensor 240 can be sensible to light having a wavelength within a spectrum that includes IR spectrum. In some embodiments, the optical sensor 240 can be sensible to IR light but not visible light. The optical sensor 240 can be a camera and can include, for example, a charge-coupled device (CCD) sensor, a complementary metal-oxide-semiconductor (CMOS) sensor, or an N-type metal-oxide-semiconductor (NMOS) sensor.

The optical sensor 240 can be mounted at any suitable part of the optical system 200, so long as the optical sensor 240 can be arranged to face the PVH layer 220 to receive light reflected by the PVH layer 220. In some embodiments, the optical system 200 can include a frame or a housing, and the optical sensor 240 can be mounted on the frame or the housing. As shown in FIG. 2B, the optical system 200 further includes a mounting member 250 for mounting the optical system 200 to an object, such as a user's head. The optical sensor 240 can be mounted at the mounting member 250. In some embodiments, the optical system 200 can include smart glasses and the mounting member 250 can include one or more temple arms. The optical sensor 240 can be mounted at one of the one or more temple arms and faces the PVH layer 220.

The optical sensor 240 can generate images of a region bounded by marginal rays indicated by the dashed lines in FIG. 2B. Besides the characteristics of the optical sensor 240 itself, some other factors can also affect the region being imaged by the optical sensor 240, such as the optical power of the PVH layer 220 and the direction of the optical axis of the PVH layer 220. Both the optical power and the optical axis direction of the PVH layer 220 can be configured by configuring the alignment of the LC molecules in the PVH layer 220. Therefore, consistent with the disclosure, the optical system 200 can be easily designed to image different regions of an object. For example, the object can be the user's head, and the PVH layer 220 can be designed in such a manner that the optical system 200 can image a portion, such as, a pupil area, of the user's eye, the entire eye of the user, an area near, such as above, below, left to, or right to, the eye of the user, or an area including the eye and the area near the eye. Thus, eye tracking can be realized.

Consistent with the disclosure, because the optical power and the optical axis direction of the PVH layer 220 depend on the alignment of the LC molecules in the PVH layer 220, the overall shape and dimensions of the PVH layer 220 can remain the same for different optical powers and/or optical axis directions. Further, because the optical power and the optical axis direction of the PVH layer 220 do not depend on the orientation of the surface of the PVH layer 220, the PVH layer 220 can be designed to reflect an incident light ray at a large angle even if the incident light ray has a zero or small incident angle onto the PVH layer 220. This provides more freedom in arranging the optical sensor 240, and a more compact design of the optical system 200 can be achieved.

In some embodiments, the optical system 200 can generate images by utilizing IR light emitted or reflected by the target being tracked, such as the user's eye. In some embodiments, as shown in FIG. 2B, the optical system 200 further includes a light source 260 configured to emit a light beam to be reflected by the target toward the PVH layer 220. The light beam emitted by the light source 260 can include a narrow spectrum or a relatively broad spectrum, and one or more wavelengths of the light beam are in the IR spectrum, i.e., the spectrum of the light source 260 can be within, overlap, or encompass the IR spectrum. In some embodiments, at least one wavelength in the spectrum of the light source 260 corresponds to the Bragg period of the Bragg grating formed by the LC molecules in the PVH layer 220. In some embodiments, the light beam emitted by the light source 260 has a wavelength in the IR spectrum and corresponding to the Bragg period of the Bragg grating in the PVH layer 220. The wavelength of the light beam can be, e.g., from about 800 nm to about 1600 nm, such as about 850 nm, about 940 nm, or about 980 nm. The Bragg period of the Bragg grating in the PVH layer 220 can be, e.g., from about 130 nm to about 270 nm, or centered at about 140 nm or about 156 nm. In some embodiments, the Bragg period can be longer, such as about 0.9 about 1 or about 1.1 μm.

Figure 3A:
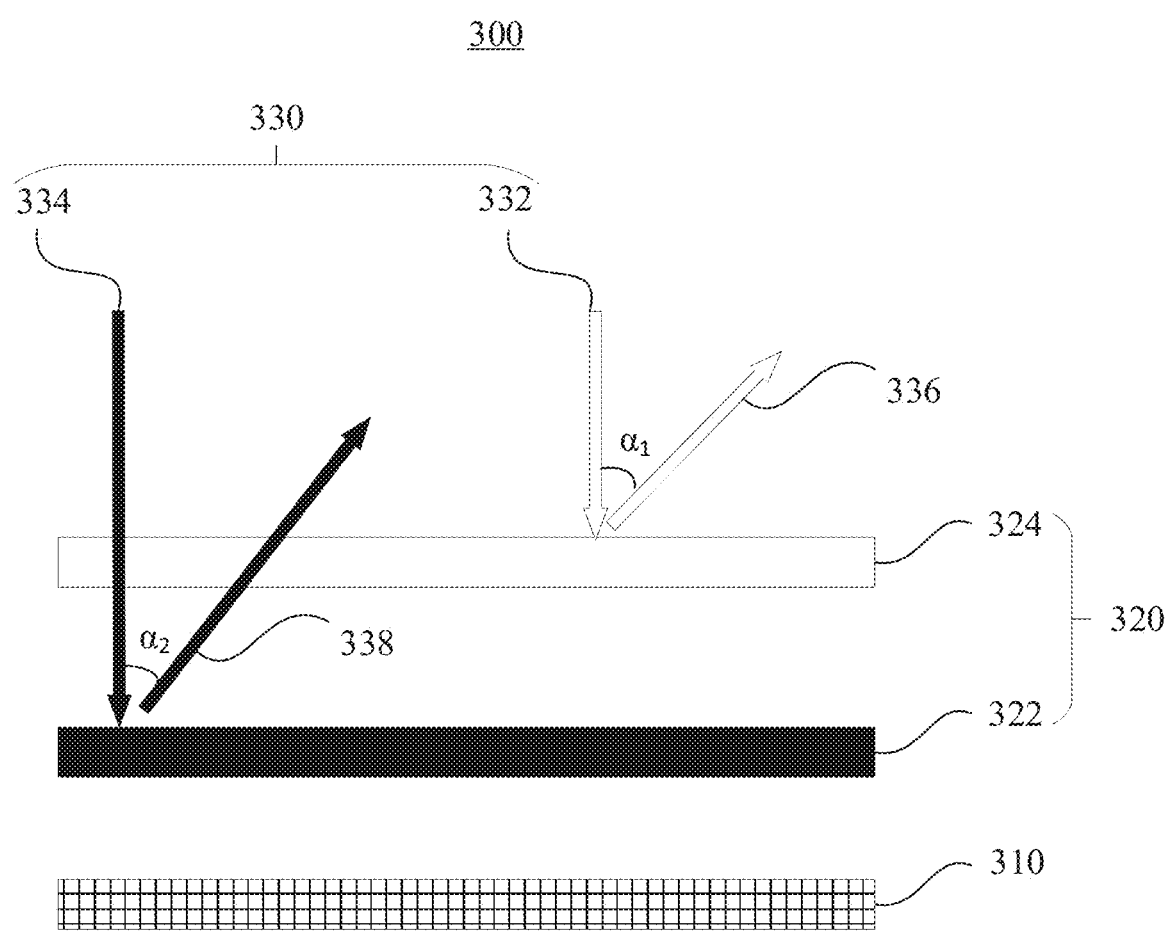
FIGS. 3A-3D are schematic views of another example optical system consistent with the disclosure.

FIG. 3A is a schematic view showing a portion of another example optical system 300 consistent with the disclosure. The optical system 300 includes a substrate 310 and a PVH composite film 320 formed over the substrate 310. The substrate 310 provides support to the PVH composite film 320, and can be, for example, a piece of rigid material, such as glass, a piece of flexible material, such as plastic, or a functional device, such as a display screen. As shown in FIG. 3A, the PVH composite film 320 includes a first PVH layer 322 formed over the substrate 310 and a second PVH layer 324 coupled to the first PVH layer 322. For illustrative purposes, in FIG. 3A, the substrate 310, the first PVH layer 322, and the second PVH layer 324 are shown as spaced apart from each other. In actual implementation, they can contact each other or be spaced apart from each other by, for example one or more spacing members, or by being held at different places of a frame or a housing of the optical system 300. In some embodiments, additional layer(s), such as protection layer(s) and/or buffer layer(s), may be arranged between each neighboring pair of the substrate 310, the first PVH layer 322, and the second PVH layer 324.

Each of the first PVH layer 322 and the second PVH layer 324 can be a PVH layer consistent with the disclosure, such as the PVH layer 100 described above in connection with FIGS. 1A-1D. In some embodiments, the handedness of the helix twist of the first PVH layer 322 can be different from (orthogonal to) the handedness of the helix twist of the second PVH layer 324. For example, one of the first PVH layer 322 and the second PVH layer 324 can have a left-handed helix twist and the other one of the first PVH layer 322 and the second PVH layer 324 can have a right-handed helix twist. For illustrative purposes and as examples, in the description below, the first PVH layer 322 is described as having a left handedness (indicated by solid block in the figure) and the second PVH layer 324 is described as having a right handedness (indicated by hollow block in the figure). In some other embodiments, the first PVH layer 322 can have a right handedness and the second PVH layer 324 can have a left handedness.

As shown in FIG. 3A, incident light 330 includes two components that are polarized in mutually perpendicular (orthogonal) directions: —a first incident light ray 332 having a right-handed circular polarization (indicated by hollow arrow in the figure) and a second incident light ray 334 having a left-handed circular polarization (indicated by solid arrow in the figure). Because the first incident light ray 332 has a same handedness as the helix twist of the second PVH layer 324, the first incident light ray 332 is reflected by the second PVH layer 324 to form a first reflected light ray 336. Further, the second PVH layer 324 does not change the handedness of the polarization of the first incident light ray 332, and hence the first reflected light ray 336 retains the handedness of the polarization, i.e., also having a right-handed circular polarization.

On the other hand, because the second incident light ray 334 has a different handedness than the second PVH layer 324, the second incident light ray 334 passes through the second PVH layer 324 without being reflected and without changing the handedness of the polarization. When the second incident light ray 334 hits the first PVH layer 322, it is reflected by the first PVH layer 322 that has a same handedness, forming a second reflected light ray 338 having a left-handed circular polarization. The second reflected light ray 338 passes through the second PVH layer 324 without being reflected and without changing the handedness of the polarization.

In some embodiments, the first incident light ray 332 and the second incident light ray 334 can have an approximately same wavelength. In these embodiments, the deflection angle cu between the first incident light ray 332 and the first reflected light ray 336 can depend on the Bragg period of the Bragg grating in the second PVH layer 324; and the deflection angle as between the second incident light ray 334 and the second reflected light ray 338 can depend on the Bragg period of the Bragg grating in the first PVH layer 322. In some embodiments, the first PVH layer 322 and the second PVH layer 324 can have different Bragg periods so that the angles $\alpha_1$ and $\alpha_2$ can be different from each other.

In some embodiments, the LC molecules of the first PVH layer 322 and the LC molecules of the second PVH layer 324 can be arranged such that the first PVH layer 322 and the second PVH layer 324 have an approximately same optical power. In some other embodiments, the LC molecules of the first PVH layer 322 and the LC molecules of the second PVH layer 324 can be arranged in such a manner that the first PVH layer 322 and the second PVH layer 324 have different optical powers. Changing the optical power of a PVH layer may also change an FOV of the PVH layer. Therefore, the first PVH layer 322 and the second PVH layer 324 can be configured to have different FOVs. In some embodiments, one of the FOV of the first PVH layer 322 and the FOV of the second PVH layer 324 can encompass another one of the FOV of the first PVH layer 322 and the FOV of the second PVH layer 324.

In some embodiments, the LC molecules of the first PVH layer 322 and the LC molecules of the second PVH layer 324 can be arranged such that the optical axis of the first PVH layer 322 and the optical axis of the second PVH layer 324 point toward an approximately same direction. In some other embodiments, the LC molecules of the first PVH layer 322 and the LC molecules of the second PVH layer 324 can be arranged such that the optical axis of the first PVH layer 322 and the optical axis of the second PVH layer 324 point toward different directions.

With different arrangements of the LC molecules in the first PVH layer 322 and the arrangement of the LC molecules in the second PVH layer 324, different combinations of optical powers, FOVs, and optical axis directions can be achieved. For example, the first PVH layer 322 and the second PVH layer 324 can have an approximately same optical power, and their optical axes can point toward different directions. As another example, the first PVH layer 322 and the second PVH layer 324 can have different optical powers, and their optical axes can point toward different directions. As a further example, the optical axes of the first PVH layer 322 and the second PVH layer 324 can point toward an approximately same direction, but the first PVH layer 322 and the second and the second PVH layer 324 can have different optical powers so that the FOV of one of the first PVH layer 322 and the second PVH layer 324 can encompass the FOV of the other one of the first PVH layer 322 and the second PVH layer 324. As a further example, the optical axes of the first PVH layer 322 and the second PVH layer 324 can point toward different directions, and the FOV of the first PVH layer 322 and the FOV of the second PVH layer 324 may or may not encompass each other, or may or may not overlap with each other. Various other combinations are possible but not listed here.

Figure 3B:
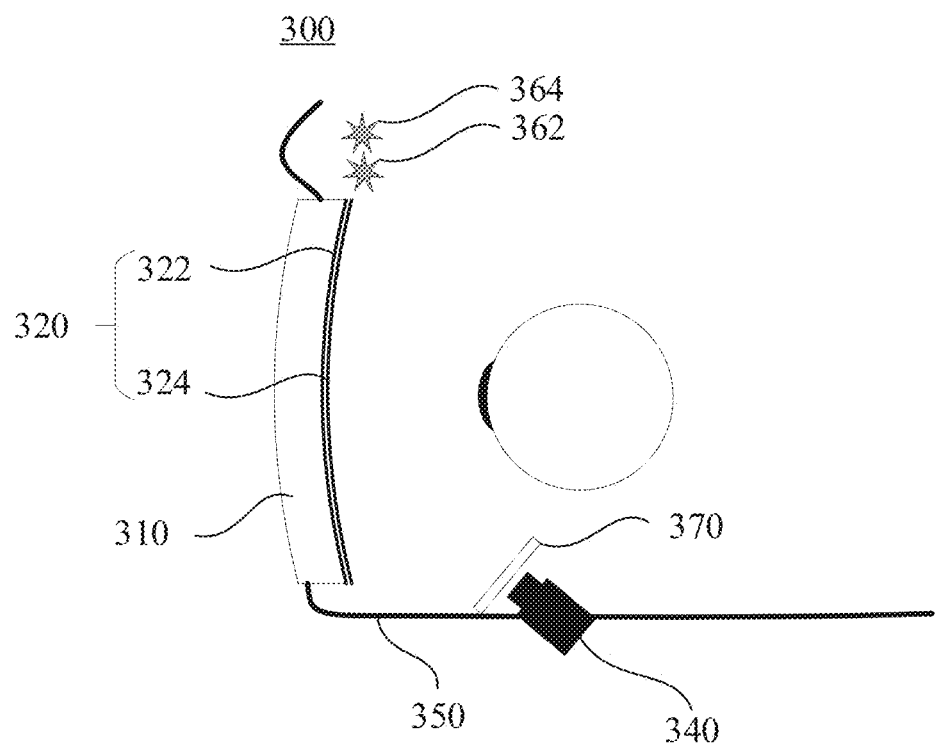

FIG. 3B is another schematic view of the optical system 300. In FIG. 3B, the optical system 300 is shown as a head-mounted display, such as smart glasses. FIG. 3B shows a portion of the optical system 300, where the un-shown portion of the optical system 300 can be symmetric to the illustrated portion of the optical system 300.

As shown in FIG. 3B, the optical system 300 further includes an optical sensor 340 configured to generate a first image using polarized light reflected by the first PVH layer 322 and to generate a second image using polarized light reflected by the second PVH layer 324. In some embodiments, the optical sensor 340 can be sensible to light having a wavelength within a spectrum that includes IR spectrum. In some embodiments, the optical sensor 340 can be sensible to IR light but not visible light. The optical sensor 340 can be a camera and can include, for example, a charge-coupled device (CCD) sensor, a complementary metal-oxide-semiconductor (CMOS) sensor, or an N-type metal-oxide-semiconductor (NMOS) sensor.

The optical sensor 340 can be mounted at any suitable part of the optical system 300, so long as the optical sensor 340 can be arranged to face the PVH composite film 320 to receive light reflected by the first PVH layer 322 and the light reflected by the second PVH layer 324. In some embodiments, the optical system 300 can include a frame or a housing, and the optical sensor 340 can be mounted on the frame or the housing. As shown in FIG. 3B, the optical system 300 further includes a mounting member 350 for mounting the optical system 300 to an object, such as a user's head. The optical sensor 340 can be mounted at the mounting member 350. In some embodiments, the optical system 300 can include smart glasses and the mounting member 350 can include one or more temple arms. The optical sensor 340 can be mounted at one of the one or more temple arms and faces the PVH composite film 320.

As described above, optical powers and optical axis directions of the first PVH layer 322 and the second PVH layer 324 can be configured by manipulating the arrangements of the LC molecules in the first PVH layer 322 and the second PVH layer 324. With different combinations of the arrangements of the LC molecules in the first PVH layer 322 and the second PVH layer 324, different combinations of imaging regions can be realized.

Figure 3C:
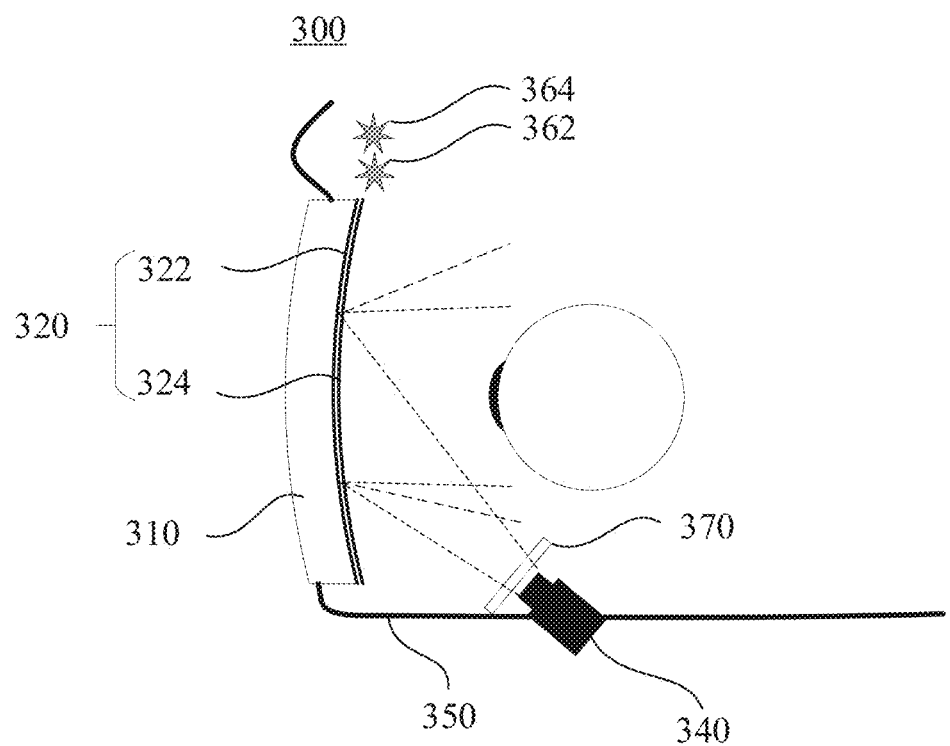
Figure 3D:
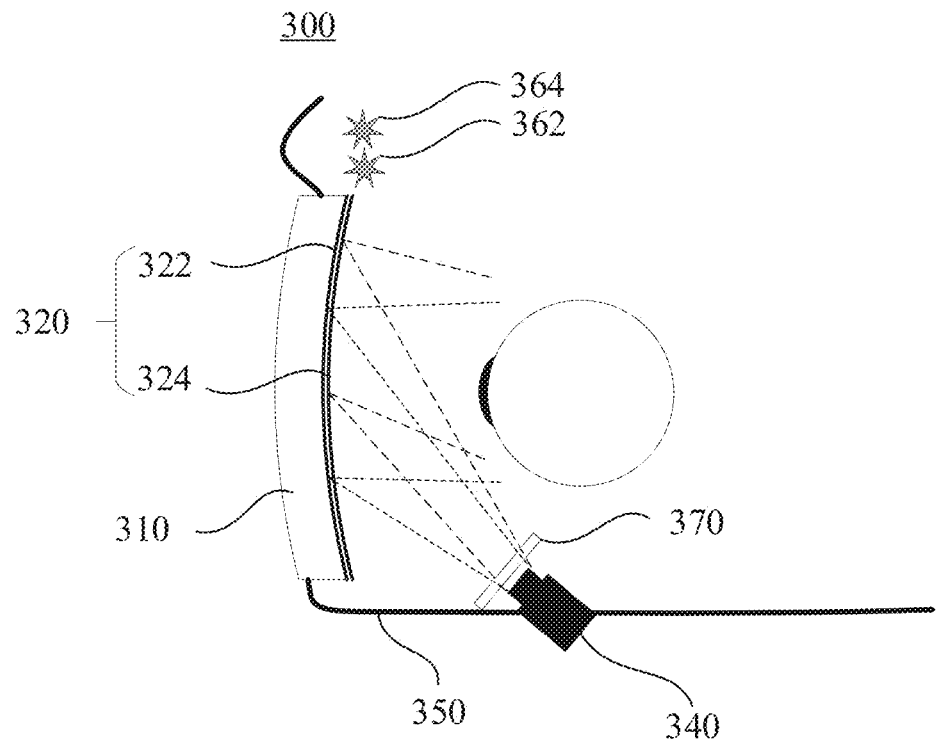

FIGS. 3C and 3D show two examples of imaging regions resulting from different combinations of arrangements of the LC molecules in (and hence different optical powers and/or optical axis directions of) the first PVH layer 322 and the second PVH layer 324. In FIGS. 3C and 3D, the short-dashed lines indicate marginal rays bounding the imaging region of the first PVH layer 322 and the long-dashed lines indicate marginal rays bounding the imaging region of the second PVH layer 324.

In the example shown in FIG. 3C, the optical power of the first PVH layer 322 can be smaller than the optical power of the second PVH layer 324, and the optical axes of the first PVH layer 322 and the second PVH layer 324 can point to an approximately same direction or slightly different directions. The FOV of the second PVH layer 324 encompasses the FOV of the first PVH layer 322. Thus, as shown in FIG. 3C, the second PVH layer 324 can image a larger region than the first PVH layer 322. For example, the first PVH layer 322 can image a pupil area of the user's eye and the second PVH layer 324 can image the entire eye of the user.

In the example shown in FIG. 3D, the optical powers of the first PVH layer 322 and the second PVH layer 324 can be approximately the same as each other, and the optical axes of the first PVH layer 322 and the second PVH layer 324 can point to different directions. The FOVs of the first PVH layer 322 and the second PVH layer 324 can be approximately the same as each other. Thus, as shown in FIG. 3D, the first PVH layer 322 and the second PVH layer 324 can image an approximately same region from different perspectives. That is, the image generated by the optical sensor 340 using the polarized light reflected by the first PVH layer 322 and the image generated by the optical sensor 340 using the polarized light reflected by the second PVH layer 324 can be approximately a same region of the target. For example, the first PVH layer 322 can image the pupil area from the left perspective (the lower perspective in the figure as presented in the drawing sheet, indicated by the short-dashed lines) and the second PVH layer 324 can image the pupil area from the right perspective (the upper perspective in the figure as presented in the drawing sheet, indicated by the long-dashed lines).

When imaging is performed from only one perspective, accuracy of eye tracking may decrease when the user looks away from an image of the optical sensor 340 (formed by the first PVH layer 322 and/or the second PVH layer 324). On the other hand, consistent with the disclosure, using two PVH layers to allow imaging the user's eye from different perspectives can increase the accuracy of eye tracking when the user's eye moves. For example, as shown in FIG. 3D, when the user looks to the left, the first PVH layer 322 can provide a higher tracking accuracy, and when the user looks to the right, the second PVH layer 324 can provide a higher tracking accuracy.

In the example shown in FIG. 3D, the FOVs of the first PVH layer 322 and the second PVH layer 324 are approximately the same as each other. In some other embodiments, with the approximately same optical powers, the optical axis directions of the first PVH layer 322 and the second PVH layer 324 can be configured in such a manner that the FOVs of the first PVH layer 322 and the second PVH layer 324 are different from each other but do not encompass each other.

In some embodiments, the optical system 300 can generate images by utilizing IR light emitted or reflected by the target being tracked, such as the user's eye. In some embodiments, as shown in, e.g., FIG. 3B, the optical system 300 further includes a light source 362 configured to emit a light beam to be reflected by the target toward the PVH composite film 320. The light beam emitted by the light source 362 can include a narrow spectrum or a relatively broad spectrum, and one or more wavelengths of the light beam are in the IR spectrum, i.e., the spectrum of the light source 362 can be within, overlap, or encompass the IR spectrum. In some embodiments, the light source 362 can have a relatively broad spectrum, and at least one wavelength in the spectrum of the light source 362 corresponds to the Bragg period of the Bragg grating formed by the LC molecules in the first PVH layer 322 and/or the Bragg period of the Bragg grating formed by the LC molecules in the second PVH layer 324. In some embodiments, the light beam emitted by the light source 362 can have a relatively narrow spectrum having a peak wavelength in the IR spectrum, and the peak wavelength can correspond to the Bragg period of the Bragg grating in the first PVH layer 322 and/or the Bragg period of the Bragg grating in the second PVH layer 324. The wavelength of the light beam can be, e.g., from about 800 nm to about 1600 nm, such as about 850 nm, about 940 nm, or about 980 nm. The Bragg period of the Bragg grating in the first PVH layer 322 can be, e.g., from about 130 nm to about 270 nm, or centered at about 140 nm or about 156 nm. The Bragg period of the Bragg grating in the second PVH layer 324 can be the same as or different from the Bragg period of the Bragg grating in the first PVH layer 322, and can be, e.g., from about 130 nm to about 270 nm, or centered at about 140 nm or about 156 nm. In some embodiments, the Bragg period in one or both of the first PVH layer 322 and the second PVH layer 324 can be longer, such as about 0.9 µm, about 1 µm, or about 1.1 µm.

In some embodiments, as shown in, e.g., FIG. 3B, the light source 362 is a first light source 362 and the light beam emitted by the light source 362 is a first light beam, and the optical system 300 further includes a second light source 364 configured to emit a second light beam to be reflected by the target toward the PVH composite film 320. The second light beam emitted by the second light source 364 can include a narrow spectrum or a relatively broad spectrum, and one or more wavelengths of the light beam are in the IR spectrum, i.e., the spectrum of the light source 364 can be within, overlap, or encompass the IR spectrum.

In some embodiments, the spectrum of the second light beam can be different from the spectrum of the first light beam. In some embodiments, the first light beam can have a first wavelength in the IR spectrum, the second light beam can have a second wavelength in the IR spectrum, and the first wavelength and the second wavelength can be different from each other. In some embodiments, the first wavelength can correspond to the Bragg period of the Bragg grating formed by the LC molecules in the first PVH layer 322, and the second wavelength can correspond to the Bragg period of the Bragg grating formed by the LC molecules in the second PVH layer 324. For example, the first wavelength can be about 850 nm and the Bragg period of the Bragg grating in the first PVH layer 322 can be about 130 nm, and the second wavelength can be about 940 nm and the Bragg period of the Bragg grating in the second PVH layer 324 can be about 157 nm.

In the embodiments described above in connection with FIGS. 3A-3D, the optical sensor 340 generates a first image using polarized light reflected by the first PVH layer 322 and a second image using polarized light reflected by the second PVH layer 324. The two images can be images of two different areas (which may be areas that one encompasses another, one overlaps another, and one separated from another), or images of the same area from different perspective. The polarized light reflected by the two PVH layers may be projected to an approximately same area of the optical sensor 340. Therefore, if the polarized light reflected by the two PVH layers is received by the optical sensor 340 at the same time, the two images may superimpose on each other and the resulting image may also be referred to as a superimposed image.

The superimposed image can be processed to obtain the two individual images. In some embodiments, the superimposed image can be processed based on characteristics of the target to separate the two images. For example, when the target is the user's eye, cues of the user's eye can be used in processing the superimposed image. The cues of the user's eye can include binocular cues, such as stereopsis, eye convergence, disparity, and yielding depth from binocular vision through exploitation of parallax, and/or monocular cues, such as size, grain, and motion parallax of the optokinetic response.

Another approach is to temporally separate the first image and the second image, i.e., allowing the light reflected by the first PVH layer 322 and the light reflected by the second PVH layer 324 to enter the optical sensor 340 at different times. In some embodiments, as shown in, e.g., FIG. 3B, the optical system 300 further includes an optical switch 370 arranged between the PVH composite film 320 and the optical sensor 340. The optical switch 370 can be attached to the optical sensor 340 or attached to another part of the optical system 300, such as the mounting member 350. In some embodiments, the optical switch 370 can be configured to be a part of the optical sensor 340.

The optical switch 370 can be configured to switch from a first state to a second state and vice versa. In the first state, the optical switch 370 can transmit the polarized light reflected by the first PVH layer 322 and block the polarized light reflected by the second PVH layer 324. In the second state, the optical switch 370 can transmit the polarized light reflected by the second PVH layer 324 and block the polarized light reflected by the first PVH layer 322.

In some embodiments, the optical switch 370 can include a quarter-wave plate and a switchable linear polarizer. The quarter-wave plate can be configured to convert circularly polarized light reflected by the first PVH layer 322 into first linearly polarized light, and convert second circularly polarized light reflected by the second PVH layer 324 into second linearly polarized light. Because the first circularly polarized light and the second circularly polarized light have orthogonal polarization directions, the polarization direction of the first linearly polarized light and the polarization direction of the second linearly polarized light can also be orthogonal to each other.

Correspondingly, the switchable linear polarizer can be configured to switch between the two orthogonal polarization directions. As such, when the polarization direction of the switchable linear polarizer is along the polarization direction of the first linearly polarized light, the optical switch 370 can transmit the light reflected by the first PVH layer 322 and block the light reflected by the second PVH layer 324. On the other hand, when the polarization direction of the switchable linear polarizer is along the polarization direction of the second linearly polarized light, the optical switch 370 can transmit the light reflected by the second PVH layer 324 and block the light reflected by the first PVH layer 322.

In some embodiments, the linear polarizer can be rotated to switch between the two orthogonal polarization directions. In some embodiments, the linear polarizer can include two pieces of polarizing materials having orthogonal linear polarization directions, and the polarization direction of the linear polarizer can be switched by mechanically moving one of the two pieces of polarizing materials into the optical path between the quarter-wave plate and the optical sensor 340. In some embodiments, the linear polarizer can include a switchable material that can change polarization direction under an external actuation. For example, the linear polarizer can include an LC film and the LC molecules in the LC film can rotate to different directions when different external voltages are applied, e.g., to form a half-wave plate.

A quarter-wave plate can convert circularly polarized light into linearly polarized light when the following condition is satisfied: $d \times \Delta n = (2m+1)\lambda/4$, where d and $\Delta n$ denote the thickness and the birefringence of the quarter-wave plate, $\lambda$ denotes the wavelength of the light in the vacuum, and m is a non-negative integer. Therefore, when the optical switch 370 includes a quarter-wave plate and a switchable linear polarizer, the light reflected by the first PVH layer 322 and the light reflected by the second PVH layer 324 may need to have an approximately same wavelength. In these embodiments, the optical system 300 may either have one light source, such as the light source 362, or have multiple light sources, such as the light source 362 and the light source 364, that emit light beams having approximately same wavelength.

As described above, in some embodiments, the optical system 300 have two light sources—the light source 362 and the light source 364, and the two light sources can emit light beams having different wavelengths (the first wavelength and the second wavelength) that can be reflected by the first PVH layer 322 and the second PVH layer 324, respectively. In these embodiments, the optical switch can include a switchable absorber that can switch between two states. In one of the two states, the absorber can absorb light having the first wavelength but not the light having the second wavelength, and in the other one of the two states, the absorber can absorb light having the second wavelength but not the light having the first wavelength. The switchable absorber can switch between the two states under an external control.

In the embodiments described above, the light reflected by the first PVH layer 322 and the light reflected by the second PVH layer 324 may be projected to an approximately same area of the optical sensor 340 and hence the image formed by the light from the first PVH layer 322 and the image formed by the light from the second PVH layer 324 may be superimposed on each other. In some other embodiments, the first PVH layer 322 and the second PVH layer 324 can be configured such that the light reflected by the first PVH layer 322 and the light reflected by the second PVH layer 324 can be projected to two different areas of the optical sensor 340, so as to avoid the images being superimposed on each other. In these embodiments, electric signals from the two different areas of the optical sensor 340 can be processed separately to obtain the images from the two PVH layers. In some embodiments, the optical sensor 340 may be longer in one dimension as compared to the other dimension.

In some embodiments, the optical system 300 may include two optical sensors, referred to as a first optical sensor and a second optical sensor, arranged side by side and each being associated with one circular polarizer covering an aperture of the corresponding optical sensor. A first circular polarizer associated with the first optical sensor can have a same handedness of polarization as the light reflected by the first PVH layer 322. As such, light reflected by the second PVH layer 324 may be blocked by the first circular polarizer, while the light reflected by the first PVH layer 322 can transmit through the first circular polarizer and form image in the first optical sensor. Similarly, a second circular polarizer associated with the second optical sensor can have a same handedness of polarization as the light reflected by the second PVH layer 324. As such, the light reflected by the first PVH layer 322 may be blocked by the second circular polarizer, while the light reflected by the second PVH layer 324 can transmit through the second circular polarizer and form image in the second optical sensor.

In some embodiments, the optical system 300 may further include a geometric phase lens arranged between the PVH composite film 320 and the optical sensor 340. The geometric phase lens can be configured to further divert light from one or both of the first PVH layer 322 and the second PVH layer 324, and hence effectively alter the focal length or effective focal length of the first PVH layer 322 and/or the focal length or effective focal length of the second PVH layer 324. As a result, a relative focal length of the first PVH layer 322 relative to the second PVH layer 324 can be altered. For example, the first PVH layer 322 may have a relatively short focal length and the second PVH layer 324 may have a relatively long focal length. Therefore, an effective depth of field of the optical system 300 as a whole may be increased.

The geometric phase lens can be arranged at any suitable location along the optical path from the PVH composite film 320 to the optical sensor 340. For example, the geometric phase lens can be arranged in front of the composite film 320, between the first PVH layer 322 and the second PVH layer 324, in front of the optical sensor 340, or integrated within the optical sensor 340.

Figure 4:
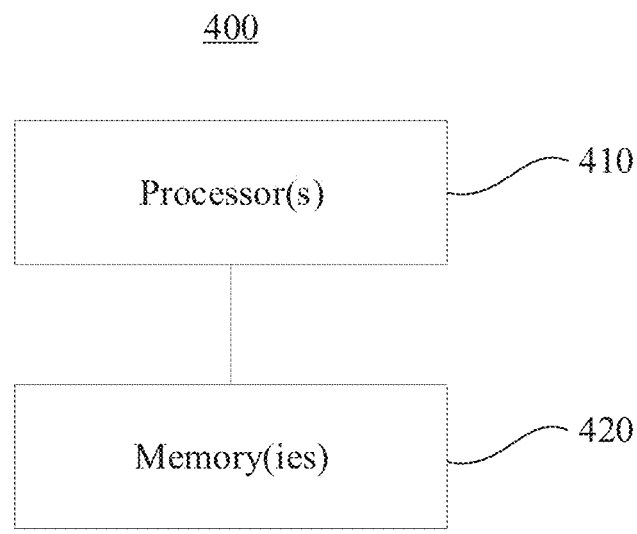
FIG. 4 is a block diagram of an example controller consistent with the disclosure.

The operation of the optical system consistent with the disclosure, such as the optical system 200 or the optical system 300 described above, can be controlled locally by a controller of the optical system 200. FIG. 4 shows a block diagram of an example controller 400 consistent with the disclosure. As shown in FIG. 4, the controller 400 includes one or more processors 410 and one or more memories 420 coupled to the one or more processors 410. The one or more memories 420 can store instructions that, when executed by the one or more processors 410, cause the one or more processors 410 to perform a method consistent with the disclosure, such as one of the example functions described above. For example, the instructions can cause the one or more processors 410 to process and record the images generated by the optical sensor 240 or 340, or to control the light source 260 or the light sources 362 and 364 to turn on or off. In the optical system 300, the instructions can cause the one or more processors 410 to separate the superimposed image to obtain the two individual images according to, e.g., the example method described above. The instructions can also cause the one or more processors 410 to control the optical switch to switch between the first state and the second state.

Each of the one or more processors 410 can include any suitable hardware processor, such as a microprocessor, a micro-controller, a central processing unit (CPU), a graphic processing unit (GPU), a network processor (NP), a digital signal processor (DSP), an application specific integrated circuit (ASIC), a field-programmable gate array (FPGA), or another programmable logic device, discrete gate or transistor logic device, discrete hardware component. Each of the one or more memories 420 can include a non-transitory computer-readable storage medium, such as a random access memory (RAM), a read only memory, a flash memory, a hard disk storage, or an optical media.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein. Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
a substrate;
a polarization volume hologram (PVH) composite film formed over the substrate, the PVH composite film including:
a first PVH layer formed over the substrate and having a helix twist of a first handedness, the first PVH layer being configured to reflect a first circularly polarized light having the first handedness; and
a second PVH layer coupled to the first PVH layer and having a helix twist of a second handedness orthogonal to the first handedness, the second PVH layer being configured to reflect a second circularly polarized light having the second handedness; and
an optical sensor configured to generate a first image based on the first circularly polarized light reflected by the first PVH layer and generate a second image based on the second circularly polarized light reflected by the second PVH layer.

2. The system of claim 1, wherein each of the first PVH layer and the second PVH layer is configured to reflect an infrared (IR) light.

3. The system of claim 2, further comprising:
a light source configured to emit a light beam that is to be reflected by a target toward the first PVH layer and the second PVH layer, the light beam having a wavelength in an IR spectrum.

4. The system of claim 3, wherein
the light source is a first light source, the light beam is a first light beam, and the wavelength is a first wavelength, and
the system further comprises:
a second light source configured to emit a second light beam that is to be reflected by the target toward the first PVH layer and the second PVH layer, the second light beam having a second wavelength in the IR spectrum that is different from the first wavelength.

5. The system of claim 4, wherein:
the first wavelength corresponds to a first Bragg period of a first Bragg grating formed by liquid crystal (LC) molecules in the first PVH layer, and the second wavelength corresponds to a second Bragg period of a second Bragg grating formed by LC molecules in the second PVH layer.

6. The system of claim 1, wherein:
the first image and the second image are different perspective views of a same region of a target.

7. The system of claim 1, wherein:
the first image and the second image are images of different regions of a target.

8. The system of claim 1, further comprising:
an optical switch arranged between the PVH composite film and the optical sensor, and configured to switch between:
  a first state, in which the optical switch transmits the first circularly polarized light reflected by the first PVH layer and blocks the second circularly polarized light reflected by the second PVH layer, and
  a second state, in which the optical switch transmits the second circularly polarized light reflected by the second PVH layer and blocks the first circularly polarized light reflected by the first PVH layer.

9. The system of claim 8, wherein the optical switch includes:
a quarter-wave plate; and
a switchable linear polarizer configured to switch between two orthogonal polarization directions.

10. The system of claim 1, wherein
the first image and the second image are superimposed on each other, and
the system further comprises:
  a processor configured to separate the first image and the second image based on features in the first image and the second image.

11. The system of claim 1, further comprising:
a temple arm connected to the substrate,
wherein the optical sensor is mounted on the temple arm and faces the PVH composite film.

12. The system of claim 1, wherein the first PVH layer and the second PVH layer have different optical powers.

13. The system of claim 1, wherein an optical axis of the first PVH layer and an optical axis of the second PVH layer point toward different directions.

14. The system of claim 13, wherein a field of view (FOV) of the first PVH layer and an FOV of the second PVH layer are approximately the same as each other.

15. The system of claim 13, wherein a field of view (FOV) of the first PVH layer and an FOV of the second PVH layer do not encompass each other.

16. The system of claim 1, wherein the first PVH layer is also configured to converge the first circularly polarized light when reflecting the first circularly polarized light, and the second PVH layer is also configured to converge the second circularly polarized light when reflecting the second circularly polarized light.

17. A system, comprising:
a substrate; and
a polarization volume hologram (PVH) composite film formed over the substrate, the PVH composite film including:
  a first PVH layer formed over the substrate and having a helix twist of a first handedness, the first PVH layer being configured to reflect a first circularly polarized light having the first handedness; and
  a second PVH layer coupled to the first PVH layer and having a helix twist of a second handedness orthogonal to the first handedness, the second PVH layer being configured to reflect a second circularly polarized light having the second handedness, wherein the first PVH layer has a first field of view (FOV),
wherein the second PVH layer has a second FOV, and
wherein one of the first FOV and the second FOV encompasses another one of the first FOV and the second FOV.

18. The system of claim 17, wherein an optical axis of the first PVH layer and an optical axis of the second PVH layer point toward an approximately same direction.

19. The system of claim 17, wherein an optical axis of the first PVH layer and an optical axis of the second PVH layer point toward different directions.

* * * * *